US008075981B2

(12) United States Patent
Pearce et al.

(10) Patent No.: US 8,075,981 B2
(45) Date of Patent: Dec. 13, 2011

(54) ALTERNATING PATTERN GEL CUSHIONING ELEMENTS AND RELATED METHODS

(75) Inventors: Tony M. Pearce, Alpine, UT (US); Terry V. Pearce, Alpine, UT (US); Russell Whatcott, Eagle Mountain, UT (US)

(73) Assignee: Edizone, LLC, Alpine, UT (US)

(*) Notice: Subject to any disclaimer, the term of this patent is extended or adjusted under 35 U.S.C. 154(b) by 265 days.

(21) Appl. No.: 12/229,724

(22) Filed: Aug. 25, 2008

(65) Prior Publication Data

US 2010/0183847 A1 Jul. 22, 2010

Related U.S. Application Data

(60) Provisional application No. 60/966,122, filed on Aug. 23, 2007, provisional application No. 60/997,300, filed on Oct. 2, 2007, provisional application No. 61/004,460, filed on Nov. 27, 2007.

(51) Int. Cl.
*B32B 1/00* (2006.01)
*B32B 3/00* (2006.01)
*B68G 5/02* (2006.01)
*F16F 1/36* (2006.01)

(52) U.S. Cl. ........ 428/174; 428/178; 428/179; 428/182; 267/142; 267/144; 264/176.1; 264/299; 264/319; 264/328.1; 5/652; 5/731

(58) Field of Classification Search .......... 428/156, 428/172, 174, 178, 179, 180, 182; 5/401, 5/652, 731; 267/142, 144; 264/176.1, 241, 264/299, 319, 328.1
See application file for complete search history.

(56) References Cited

U.S. PATENT DOCUMENTS

| | | | |
|---|---|---|---|
| 1,228,783 A | 6/1917 | Kerivan | |
| 2,029,370 A | 2/1936 | Heldenbrand | |
| 2,491,557 A | 12/1949 | Goolsbee | |
| 2,617,751 A | 11/1952 | Bickett | |
| 2,655,369 A | 10/1953 | Musilli | |
| 2,672,183 A | 3/1954 | Forsyth | |
| 2,814,053 A | 11/1957 | Sevik | |
| 2,887,425 A | 5/1959 | Holland | |
| 3,043,731 A | 7/1962 | Hill | |
| 3,197,357 A * | 7/1965 | Schulpen | 428/158 |
| 3,222,697 A | 12/1965 | Scheermesser | |
| 3,308,491 A | 3/1967 | Spence | |
| 3,407,406 A | 10/1968 | Werner et al. | |

(Continued)

FOREIGN PATENT DOCUMENTS

EP 0614622 A1 9/1994

(Continued)

OTHER PUBLICATIONS

Walker, Benjamin M., et al., Handbook of Thermoplastic Elastomers, Second Edition, 1988, pp. 26-28, Van Nostrand Reinhold Company, Inc., New York, New York.

(Continued)

*Primary Examiner* — Donald J Loney
(74) *Attorney, Agent, or Firm* — TraskBritt

(57) ABSTRACT

An alternating pattern gel cushioning device and methods for making the same. The gel pattern may be two- or three-dimensional. The devices may be zoned or stacked. The device may be made by a variety of methods including roller molding, open-face molding, injection molding, casting, extrusion, compression molding and other methods.

25 Claims, 10 Drawing Sheets

U.S. PATENT DOCUMENTS

| | | | |
|---|---|---|---|
| 3,459,179 A | 8/1969 | Olesen | |
| 3,462,778 A | 8/1969 | Whitney | |
| 3,518,786 A | 7/1970 | Holtvoight | |
| 3,529,368 A | 9/1970 | Canfiled | |
| 3,552,044 A | 1/1971 | Wiele | |
| 3,605,145 A | 9/1971 | Graebe | |
| 3,748,669 A | 7/1973 | Warner | |
| 3,748,779 A | 7/1973 | Cherk et al. | |
| 3,801,420 A | 4/1974 | Anderson | |
| 3,893,198 A | 7/1975 | Blair | |
| 3,940,811 A * | 3/1976 | Tomikawa et al. | 5/740 |
| 3,968,530 A | 7/1976 | Dyson | |
| 3,986,213 A | 10/1976 | Lynch | |
| 4,038,762 A | 8/1977 | Swan, Jr. | |
| 4,083,127 A | 4/1978 | Hanson | |
| 4,144,658 A | 3/1979 | Swan, Jr. | |
| 4,163,297 A | 8/1979 | Neumark | |
| 4,229,546 A | 10/1980 | Swan, Jr. | |
| 4,243,754 A | 1/1981 | Swan, Jr. | |
| 4,247,963 A | 2/1981 | Reddi | |
| 4,252,910 A | 2/1981 | Schaefer | |
| 4,255,202 A | 3/1981 | Swan, Jr. | |
| 4,256,304 A | 3/1981 | Smith et al. | |
| 4,274,169 A | 6/1981 | Standiford | |
| 4,279,044 A | 7/1981 | Douglas | |
| 4,292,701 A | 10/1981 | Woychick | |
| 4,335,476 A | 6/1982 | Watkin | |
| 4,335,478 A | 6/1982 | Pittman | |
| 4,369,284 A | 1/1983 | Chen | |
| 4,370,769 A | 2/1983 | Herzig et al. | |
| 4,383,342 A | 5/1983 | Forster | |
| 4,422,194 A | 12/1983 | Viesturs et al. | |
| 4,467,053 A | 8/1984 | Markle | |
| 4,472,847 A | 9/1984 | Gammons et al. | |
| 4,483,029 A | 11/1984 | Paul | |
| 4,485,505 A | 12/1984 | Paul | |
| 4,485,568 A | 12/1984 | Landi et al. | |
| 4,498,205 A | 2/1985 | Hino | |
| 4,541,136 A | 9/1985 | Graebe | |
| 4,572,174 A | 2/1986 | Eilender et al. | |
| 4,588,229 A | 5/1986 | Jay | |
| 4,614,632 A * | 9/1986 | Kezuka et al. | 264/280 |
| 4,618,213 A | 10/1986 | Chen | |
| 4,628,557 A | 12/1986 | Murphy | |
| 4,660,238 A | 4/1987 | Jay | |
| 4,686,724 A | 8/1987 | Bedford | |
| 4,698,864 A | 10/1987 | Graebe | |
| 4,709,431 A | 12/1987 | Shaktman | |
| 4,713,854 A | 12/1987 | Graebe | |
| 4,726,624 A | 2/1988 | Jay | |
| 4,728,551 A | 3/1988 | Jay | |
| 4,737,998 A | 4/1988 | Johnson, Sr. | |
| 4,744,564 A | 5/1988 | Yamada | |
| 4,761,843 A | 8/1988 | Jay | |
| 4,842,330 A | 6/1989 | Jay | |
| 4,913,755 A | 4/1990 | Grim | |
| 4,945,588 A | 8/1990 | Cassidy et al. | |
| 4,952,190 A | 8/1990 | Tarnoff et al. | |
| 4,952,439 A | 8/1990 | Hanson | |
| 4,953,913 A | 9/1990 | Graebe | |
| 4,959,059 A | 9/1990 | Eilender et al. | |
| 4,967,433 A | 11/1990 | Neal | |
| 5,010,608 A | 4/1991 | Barnett et al. | |
| 5,013,518 A | 5/1991 | Nielinger et al. | |
| 5,015,313 A | 5/1991 | Drew et al. | |
| 5,018,790 A | 5/1991 | Jay | |
| 5,020,176 A | 6/1991 | Dotson | |
| 5,027,801 A | 7/1991 | Grim | |
| 5,039,567 A | 8/1991 | Landi et al. | |
| 5,052,068 A | 10/1991 | Graebe | |
| 5,053,436 A | 10/1991 | Delgado | |
| 5,058,291 A | 10/1991 | Hanson | |
| 5,074,620 A | 12/1991 | Jay et al. | |
| 5,079,786 A | 1/1992 | Rojas | |
| 5,079,787 A | 1/1992 | Pollmann | |
| 5,093,138 A | 3/1992 | Drew et al. | |
| 5,100,712 A | 3/1992 | Drew et al. | |
| 5,103,518 A | 4/1992 | Gilroy et al. | |
| 5,111,544 A | 5/1992 | Graebe | |
| 5,147,685 A | 9/1992 | Hanson | |
| 5,149,173 A | 9/1992 | Jay et al. | |
| 5,152,023 A | 10/1992 | Graebe | |
| 5,153,956 A | 10/1992 | Nold | |
| 5,163,196 A | 11/1992 | Graebe et al. | |
| 5,171,766 A | 12/1992 | Mariano et al. | |
| 5,172,494 A | 12/1992 | Davidson | |
| 5,180,619 A | 1/1993 | Landi et al. | |
| 5,190,504 A | 3/1993 | Scatterday | |
| 5,191,752 A | 3/1993 | Murphy | |
| 5,201,780 A | 4/1993 | Dinsmoor, III et al. | |
| 5,203,607 A | 4/1993 | Landi | |
| 5,204,154 A | 4/1993 | Drew et al. | |
| 5,211,446 A | 5/1993 | Jay et al. | |
| 5,255,404 A | 10/1993 | Dinsmoor, III et al. | |
| 5,262,468 A | 11/1993 | Chen | |
| 5,282,286 A | 2/1994 | MacLeish | |
| 5,289,878 A | 3/1994 | Landi et al. | |
| 5,314,735 A | 5/1994 | Kronberg | |
| 5,330,249 A | 7/1994 | Weber et al. | |
| 5,334,646 A | 8/1994 | Chen | |
| 5,334,696 A | 8/1994 | Olson et al. | |
| 5,335,907 A | 8/1994 | Spector | |
| 5,336,708 A | 8/1994 | Chen | |
| 5,352,023 A | 10/1994 | Jay et al. | |
| 5,360,653 A | 11/1994 | Ackley | |
| 5,362,734 A | 11/1994 | Ward et al. | |
| 5,362,834 A | 11/1994 | Schapel et al. | |
| 5,369,828 A | 12/1994 | Graebe | |
| 5,403,642 A | 4/1995 | Landi et al. | |
| 5,421,874 A | 6/1995 | Pearce | |
| 5,429,852 A | 7/1995 | Quinn | |
| 5,444,881 A | 8/1995 | Landi et al. | |
| 5,445,861 A | 8/1995 | Newton et al. | |
| 5,452,488 A | 9/1995 | Reinhardt | |
| 5,456,072 A | 10/1995 | Stern | |
| 5,490,299 A | 2/1996 | Dinsmoor, III et al. | |
| 5,496,610 A | 3/1996 | Landi et al. | |
| 5,508,334 A | 4/1996 | Chen | |
| 5,549,743 A | 8/1996 | Pearce | |
| 5,592,706 A | 1/1997 | Pearce | |
| 5,617,595 A | 4/1997 | Landi et al. | |
| 5,626,657 A | 5/1997 | Pearce | |
| 5,633,286 A | 5/1997 | Chen | |
| 5,636,395 A | 6/1997 | Serda | |
| 5,689,845 A | 11/1997 | Sobieralski et al. | |
| 5,749,111 A | 5/1998 | Pearce | |
| 5,994,450 A | 11/1999 | Pearce | |
| 6,026,527 A | 2/2000 | Pearce | |
| 6,187,837 B1 | 2/2001 | Pearce | |
| 6,241,695 B1 | 6/2001 | Dabir | |
| 6,413,458 B1 | 7/2002 | Pearce | |
| 6,498,198 B2 | 12/2002 | Pearce | |
| 6,598,321 B2 * | 7/2003 | Crane et al. | 36/43 |
| 6,704,961 B2 | 3/2004 | Kienlein | |
| 6,797,765 B2 | 9/2004 | Pearce | |
| 6,865,759 B2 | 3/2005 | Pearce | |
| 6,905,431 B2 | 6/2005 | Pearce et al. | |
| 6,908,662 B2 | 6/2005 | Pearce | |
| 7,060,213 B2 | 6/2006 | Pearce | |
| 7,076,822 B2 | 7/2006 | Pearce | |
| 7,444,703 B2 | 11/2008 | Jansen | |
| 7,666,341 B2 | 2/2010 | Pearce | |
| 2004/0172766 A1 | 9/2004 | Formenti | |
| 2006/0194925 A1 | 8/2006 | Pearce | |
| 2007/0246157 A1 | 10/2007 | Mason et al. | |
| 2009/0246449 A1 | 10/2009 | Jusiak | |

FOREIGN PATENT DOCUMENTS

| | | |
|---|---|---|
| GB | 1106958 | 3/1968 |
| GB | 1261475 | 1/1972 |
| GB | 2150431 A | 7/1985 |
| KR | 20-0315625 | 6/2003 |
| KR | 20-03802721 | 3/2005 |
| KR | 10-2007-0026934 | 3/2007 |
| WO | 88/10339 A1 | 12/1988 |
| WO | 91/04290 A1 | 4/1991 |

| | | |
|---|---|---|
| WO | 92/14387 A1 | 9/1992 |
| WO | 96/39065 A1 | 12/1996 |
| WO | 97/17001 A1 | 5/1997 |

OTHER PUBLICATIONS

U.S. Appl. No. 61/039,259 filed Mar. 25, 2008, 26 pages.
International Search Report and Written Opinion for International Application No. PCT/US2010/035587, Publication No. WO 2010/135542, mailed Jan. 3, 2011 (7 pages).
International Search Report and Written Opinion for International Application No. PCT/US2010/035602, Publication No. WO 2010/135550, mailed Dec. 22, 2010 (8 pages).
International Search Report and Written Opinion for International Application No. PCT/US2010/035635, Publication No. WO 2010/135565, mailed Dec. 27, 2010.

* cited by examiner

FIG. 7
FIG. 8A
FIG. 8B
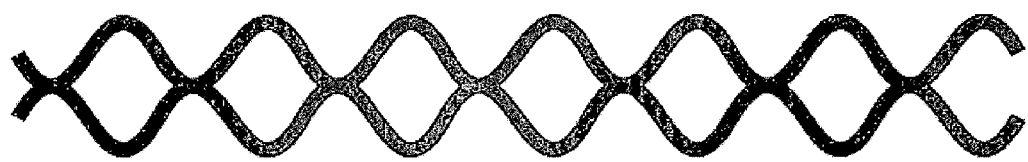
FIG. 9

ALTERNATING PATTERN GEL CUSHIONING ELEMENTS AND RELATED METHODS

CROSS-REFERENCE TO RELATED APPLICATIONS

The present application claims priority to U.S. Provisional Patent Application Ser. No. 61/004,460, filed Nov. 27, 2007; to U.S. Provisional Patent Application Ser. No. 60/997,300, filed Oct. 2, 2007; and to U.S. Provisional Patent Application Ser. No. 60/966,122, filed Aug. 23, 2007, the disclosure of each of which is hereby incorporated by this reference in its entirety.

BACKGROUND

The embodiments of the present invention relates to gels formed into a three-dimensional pattern or alternating pattern gel such that it is useful as a cushion or as part of a cushioning device.

SUMMARY

Various three-dimensionally patterned gel cushions, alternating patterned gels, materials and methods for making the same are disclosed.

BRIEF DESCRIPTION OF THE SEVERAL VIEWS OF THE DRAWINGS

FIG. 7 depicts a cross-section of another embodiment of an alternating pattern gel.

FIGS. 8A and 8B depict cross-sections of other embodiments of alternating pattern gel.

FIG. 9 depicts a cross-section of stacked gels, wherein the gels are stacked on protrusions.

DETAILED DESCRIPTION

Gel

The subject matter hereof relates to gel cushions that use gel or any other elastomer as all or part of the cushions. By gel, we mean an elastomeric gel such as a solid elastomer extended by at least 20 parts plasticizer per 100 parts solid elastomer by weight (20:100). The elastomer could be a hydrogenated poly-isoprene/butadiene (SEEPS), SEBS or SEPS elastomer, or other elastomer, as desired. In some instances, the solid elastomer is extended to at least 50:100 and most preferably by at least 100:100. Some acceptable gels are described by Tony M. Pearce's several patents on gel (such as U.S. Pat. No. 5,994,450, which is hereby incorporated by reference, and which describes multi-block copolymers with a variety of plasticizers, typically mineral oil). A useful gel is KRATON® E1830 elastomer made by Kraton Polymers, Inc., of Houston, Tex., extended by white food grade mineral oil such as CARNATION® oil. Another useful gel is SEPTON® 4055 elastomer made by Septon USA and Kuraray America, Inc., extended by CARNATION® oil or other white food grade mineral oil. Other useful gels include polyurethane-based gels, silicone-based gels, PVC-based gels, acrylic-based gels, and many others.

The products and processes herein can also utilize non-gel elastomers in place of the gel elastomers described, but in many cases describe the product as including gel by way of example and for simplicity, but not by way of limitation of the bounds of the invention. For example, instead of gel elastomer, the elastomer can be any of the following: rubber, thermoplastic elastomer, a polyvinyl chloride synthetic rubber, polyurethane, polyurethane film, polyurethane foam, polyurethane memory foam, foamed gel, latex rubber, synthetic latex rubber, latex foam rubber, latex foam, polyolefin, foamed polyolefin (including, but not limited to, foamed polyethylene), or any other flexible or elastic material. The inventors have discovered that the optional addition of hollow microspheres not only lightens the gel and reduces cost, but also can aid in the manufacturing process by changing the characteristics of the gel in the melted or liquid phase. The inventors have discovered that foaming the gel (open cell or closed cell foam) can also be advantageous in reducing weight and/or material cost.

In addition, the inventors have discovered that an alternating patterned gel makes an excellent cushion, for example, for a layer within a mattress. By "alternating patterned gel" it is meant that a gel has one pattern on a first side of a cushioning element, and a like or unlike pattern on the second side, with the most protruding parts of the pattern on the first side being aligned more or less with the least protruding (or most recessed) parts of the pattern on the second side.

Alternating Pattern Gel Configurations

Figure 1:
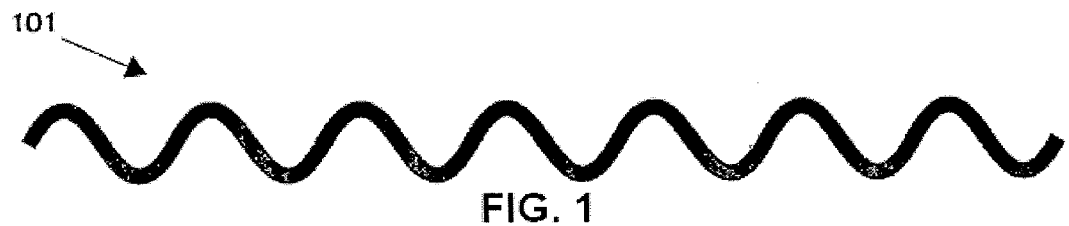
FIG. 1 depicts a cross-section of an exemplary three-dimensionally patterned or alternating pattern gel.

For example, see the cross-section of a cushioning element in FIG. 1. FIG. 1 depicts an exemplary three-dimensionally patterned or alternating pattern gel 101. The "bumps" (e.g., most protruding parts) on the top correspond to the "holes" (e.g., most recessed parts) on the bottom.

Figure 2:
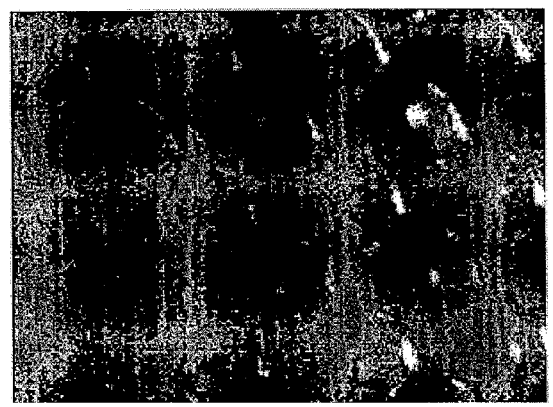
FIGS. 2 and 3 depict top and bottom views of the exemplary three-dimensionally patterned or alternating pattern gel of FIG. 1.
Figure 3:
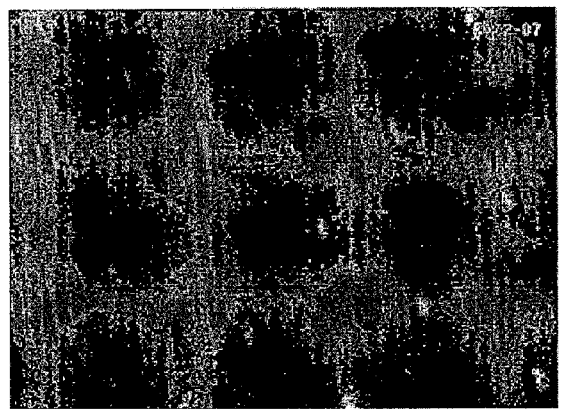
Figure 2A:
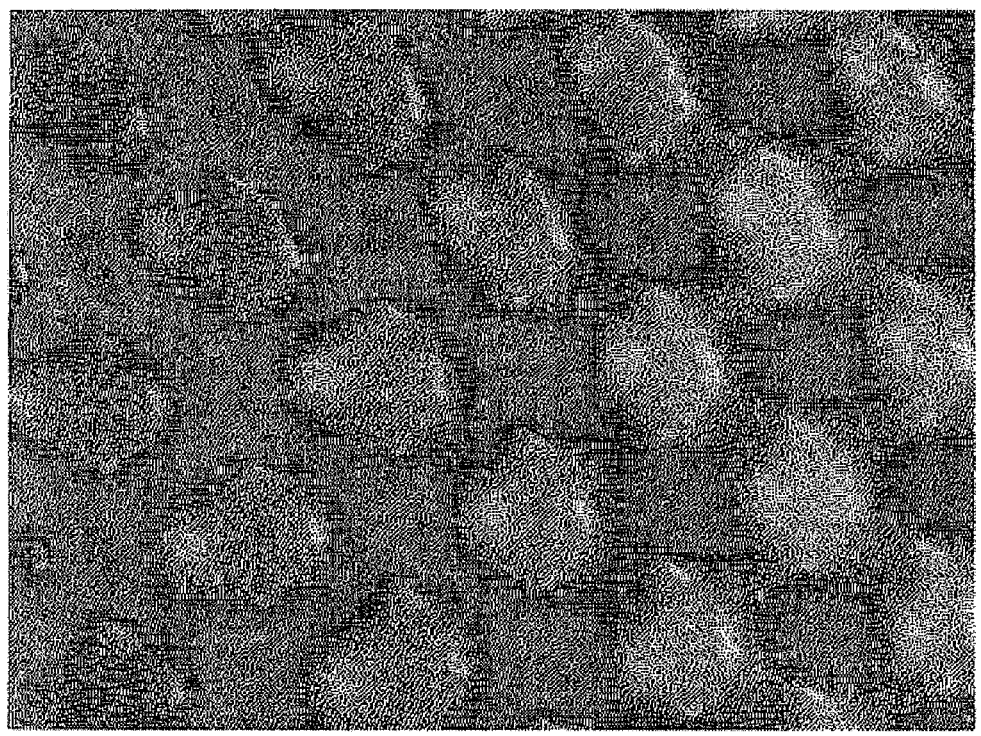
FIGS. 2A and 3A provide alternative depictions of the views of FIGS. 2 and 3.
Figure 3A:
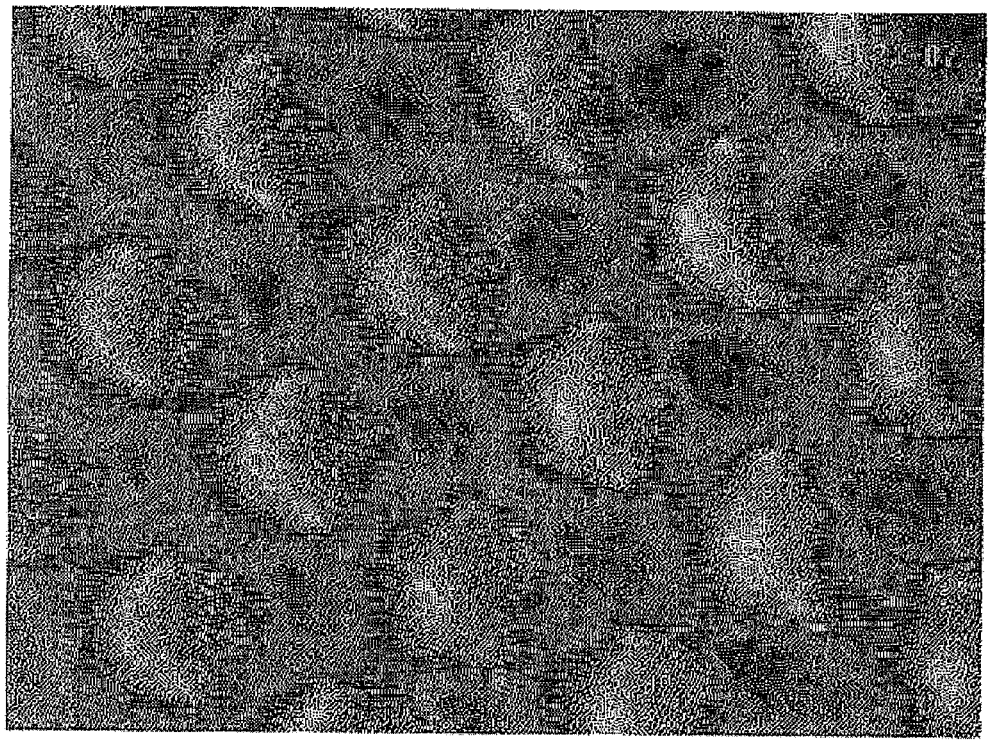
Figure 4:
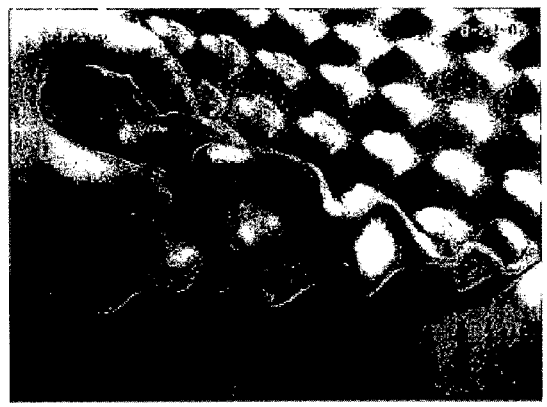
FIG. 4 depicts another view of the exemplary three-dimensionally patterned or alternating pattern gel of FIG. 1.

FIGS. 2 and 3 depict top and bottom views of the exemplary three-dimensionally patterned or alternating pattern gel of FIG. 1. As an example, this gel device can be made from SEBS elastomer KRATON® E1830 (about 100 parts by weight) and CARNATION® oil mineral oil (about 300 parts by weight). To this gel may be added 35% by volume glass hollow microspheres of 0.21 specific gravity. FIG. 4 shows both sides of the exemplary three-dimensionally patterned or alternating gel of FIG. 1 at once, demonstrating that the pattern is alternating.

While the appearance of the exemplary three-dimensionally patterned or alternating gel in FIGS. 2 and 3 has some similarity to convoluted foam, there are major differences, and these differences result in substantial structural and performance differences in the cushioning element. For example, convoluted foam is made by compressing a flat piece of foam in a patterned mold, then slicing through it. When the compression is removed, the foam re-expands and has the pattern on one side, rather than having an alternating pattern, such as may be included in the embodiments of present invention. Further, the alternating pattern gel is not made from compressible foam, but rather from a molded gel, changing both the feel and function, as well as the way it is made.

Figure 4A:
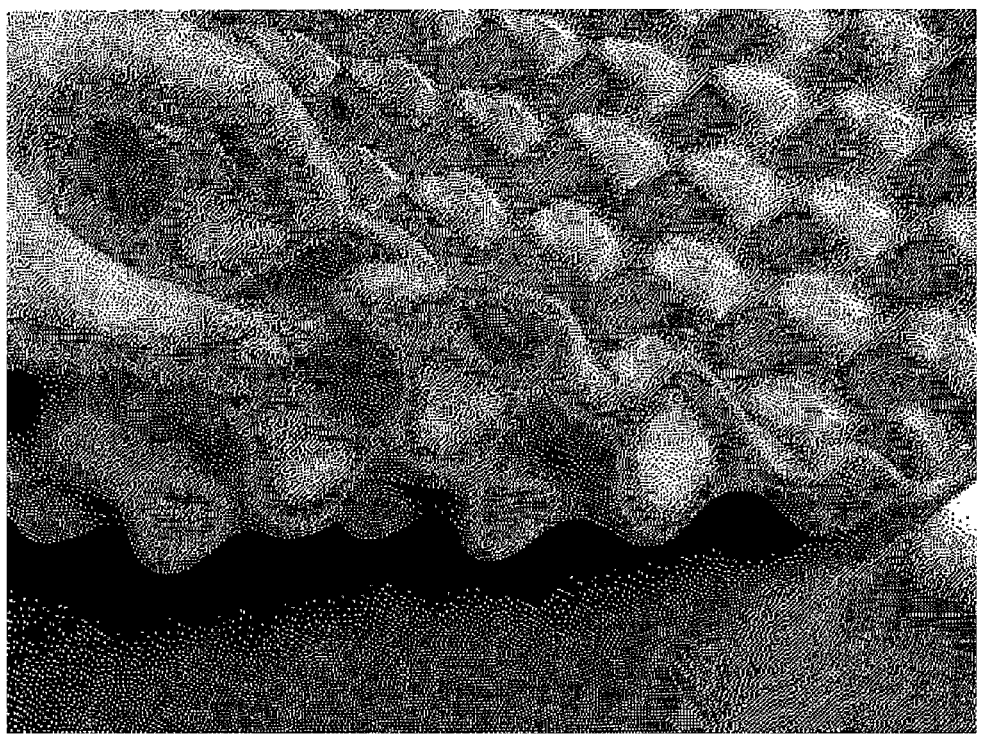
FIG. 4A provides an alternative depiction of the view of FIG. 4.
Figure 4B:
FIG. 4B depicts a similar alternating pattern gel.
Figure 4C:
FIG. 4C depicts yet another alternating pattern gel, but with protrusions on one side and without any such protrusions on its reverse side.

FIG. 4 depicts another view of the exemplary three-dimensionally patterned or alternating gel of FIG. 1. FIG. 4A provides an alternative depiction of the view of FIG. 4. FIG. 4B depicts a similar alternating pattern gel. FIG. 4C depicts yet another alternating pattern gel, but with protrusions on one side and without any such protrusions on its reverse side.

Figure 5:
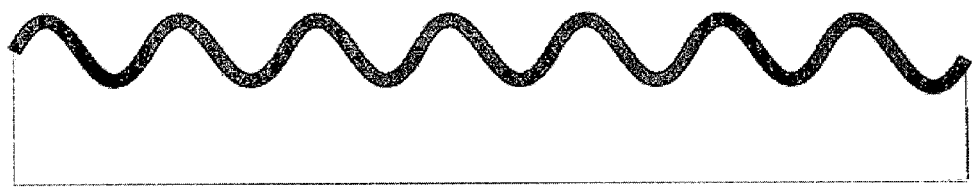
FIG. 5 depicts a cross-section of an exemplary alternating pattern gel mounted to a base, such as foam.

FIG. 5 depicts an exemplary alternating pattern gel optionally mounted to a base, such as a foam. The base may be gel, or another material as desired. The base may be formed to fit the protuberances and recesses of the alternating pattern gel, for a form-fit. Or the base may be otherwise formed, so that the alternating pattern gel contacts the base at the protuberances or otherwise, or across part or all of its surface area. Examples of base material, without limitation, are convoluted polyurethane foam, latex foam, memory foam, etc. An exemplary hybrid cushion would take on some of each of the characteristics of unsupported alternating pattern gel and the base, as well as exhibit an overall unique character.

Figure 5A:
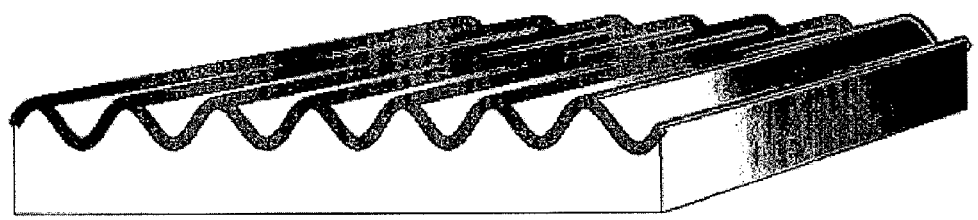
FIG. 5A depicts another view of the exemplary alternating pattern gel mounted to a base of FIG. 5.

FIG. 5A shows another view of the exemplary alternating pattern gel of FIG. 5, where the alternating pattern gel is shown to have a two-dimensional pattern, but to be a three-dimensional object. This can apply to any of the cross-sectional shapes applicable to the alternating patterned gel, by simply making the cross-section uniform across the width of the cushioning element. The alternating pattern is not limited to a uniform three-dimensional undulation, but can take many forms, including irregular forms. By way of non-limiting example, the two-dimensional alternating pattern of FIG. 5A would work well with a fabric heat-fused top and bottom, and then the fabric glued to a foam base and a foam cap (in this case, unlike FIG. 5, the form-fitting base would not be part of it).

Figure 6:
FIG. 6 depicts a cross-section of another embodiment of an alternating pattern gel.

FIG. 6 shows another embodiment that is adapted for easy use as a cushioning element in combination with other cushioning elements or with a base of any kind. Gel is not generally easy to glue to other items (although it is possible with certain adhesives). In the embodiment of FIG. 6, an alternating sine wave gel has a fabric (stretchable or non-stretchable, of any type) heat-fused into the most protruding parts (which can be done on one or both sides). The fabric can then easily be glued to other materials such as foam, mattress ticking fabric, sofa/chair upholstery fabric, a hard or flexible base, another gel cushioning element of this invention that has fabric heat fused into it, or many other things. The embodiment of FIG. 6 makes an excellent cushion because the gel is free to move away from high pressure points. However, the examples of FIG. 5 and FIG. 6, both within the scope of the invention, each have applications. For example, a cushioning element of FIG. 5 can be firmer (more supportive), and that of FIG. 6 can be more pressure relieving, given the same gel material and configuration. These two may even be used in the same cushion, such as, for example, in a mattress where the cushion element of FIG. 5 may be placed in an area under the torso to support the back and the cushion of FIG. 6 is placed in an area under the hips and shoulders to relieve pressure, or in any other layered configuration.

FIG. 7 shows another exemplary embodiment, where the protuberances and recesses are in a square pattern as shown. An infinite variety of patterns are within the scope of the invention.

FIGS. 8A and 8B show two other exemplary embodiments where there are protrusions on an alternating pattern gel, but without corresponding recesses. The protuberances on each side are solid, such as in a checkerboard pattern as shown in this example. When picturing a checkerboard, the protuberances pointing up would correspond with the red squares and the protuberances pointing down on (the other side) would correspond with the black squares. Again, in this example where the "bumps" are not hollow, an infinite variety of patterns and shapes are within the scope of the invention.

One valuable part of our invention is that it can be stacked for even more significant pressure relief, or deeper pressure relief. As an example, FIG. 9 shows a double layer that is heat-fused at the most protruding parts of each "bump."

Figure 10:
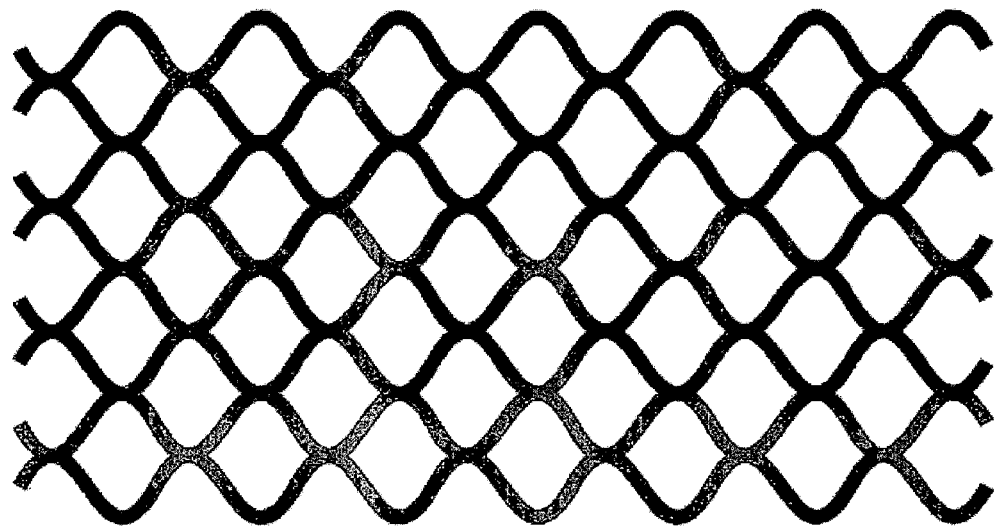
FIG. 10 also depicts a cross-section of stacked gels, but with more layers of stacked gels.

FIG. 10 shows another embodiment of stacked gels, with even more layers, adhesively bonded, heat fused, or solvent fused or in other ways joined.

Figure 11:
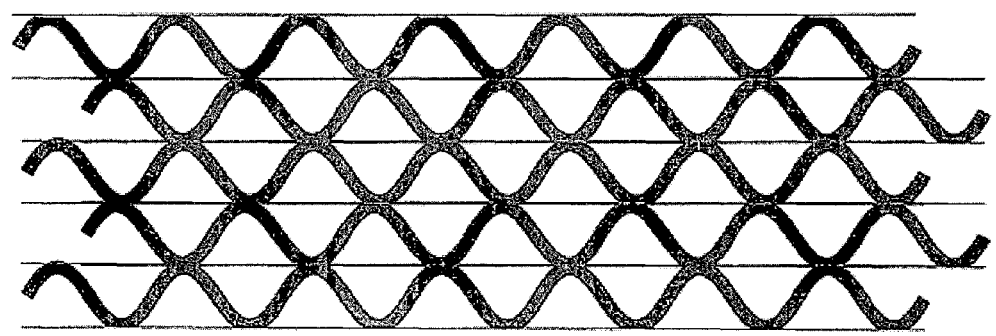
FIG. 11 depicts a cross-section of stacked gels with a fabric sheet between layers of gel.

FIG. 11 shows an example of multiple layers that are joined by heat fusing fabric top and bottom as described above, then adhesively bonding the top fabric on one layer to the bottom fabric of another layer, and repeating this as many times as desired. As an alternative to this, the fabric can be every other layer, with heat fusing or adhesive bonding being every other layer. As another alternative that can have advantageous shear-relieving properties, a layer of elastomeric gel can be used to replace any of the layers of fabric in the FIG. 11 example or to replace the fabric in any other example in this specification where fabric is heat-fused to the gel. Or, to achieve a similar effect, a highly extensible fabric can be chosen, such as a multi-way stretch fabric (such as Spandex or LYCRA®).

The pattern of the alternating pattern gel need not be uniform. It can be variegated to be more pleasing to the eye, or can be made different in different areas ("zoned") to fill different cushioning needs. For example, the pattern can be denser (the "bumps" closer together) in areas of a mattress (such as under the torso) to firm it up (for example, to provide additional back support), or the pattern can be less dense (the "bumps" spaced farther apart) and under the hips and shoulders to provide additional pressure relief. The same can be done in different areas of a shoe insole or midsole, for example, to provide more support under the arch and more pressure relief under the ball of the foot. Zoning can be done by varying the gel thickness, by any type of configuration differentiation, or even by varying gel formulation in different parts of the cushion. The overall thickness of the cushion (the distance between the upward protrusions and the downward protrusions) can vary within the same cushion.

The pattern of the alternating pattern gel can be any depicted in the figures or described herein, from the list as follows, or any other conceivable pattern that will perform a cushioning function: sine waves, straight-sided, curvy-sided, waves of any other shape (including straight-sided and curvy-sided), square patterns, rectangular patterns, circular patterns, oval patterns, polygon patterns of even-length sides, and polygon patterns with sides of uneven lengths. Also, combinations of the above listed shapes or other shapes including: combined shapes in each alternating pattern, for example, a square morphing into a circle; and a cushion that is zoned with some patterns of one shape and some of another, like sine waves in one area of the cushion and square patterns in another part, or big sine waves in one part and smaller amplitude sine waves in another part.

The inventors have found that the alternating pattern gel is exceptionally good in many cushioning applications, including when used in conjunction with other cushioning elements. Moreover, there is a synergism that is created when the cushion is properly designed from this combination. Below are some non-limiting examples: alternating pattern gel on top of mattress innersprings; a gel alternating pattern cushion on top of mattress latex foam rubber; alternating pattern gel on top of furniture cushion polyurethane foam; a polyurethane foam alternating pattern cushion on top of a solid slab of mattress polyurethane foam; alternating pattern gel on top of mattress polyurethane foam; 1 inch of latex foam rubber on top of alternating pattern gel, which is in turn on top of 3 inches of memory foam in a mattress; 1 inch of polyurethane foam on top of alternating pattern gel, which is in turn on top of 3 inches of pocketed coil springs in a sofa cushion; alternating pattern gel on top of a slab of polyurethane foam within a cover as a wheelchair cushion; and so on. The properties of the alternating pattern gel cushion should be designed with the properties of the other cushion(s) used in conjunction to yield the optimum blend of cost, ease of manufacture, and situationally effective cushioning properties.

Possible Products

Without limitation, three-dimensionally patterned gels can be used in the following products: sleeping pads, mattresses, toppers, pillows (bed, sofa, and positioners), shoes and boots (footwear), insoles, sock liners (ankle cushions, cuff cushions), futons, zabutons, furniture (i.e., sofas, loveseats, recliners, ottomans, upholstered chairs, office chairs, medical chairs), theater seating, side chairs, patio and lawn furniture, stadium seats, wheelchair cushions (i.e., seat, back, arm, knee, and head support cushions), massage tables, exam tables, carpet pads, strap cushions (such as for backpacks, fanny packs, golf bags, purses, bras, luggage, briefcases, computer cases, after market/generic), saddle straps, straps of various kinds (such as for horses, climbing, parachute, safety/industrial), automotive, motorcycles and ATVS (seating, trim, headliners, panels), boats (seating, trim, headliners, panels), aircraft (seating, trim, headliners, panels), tool handles, appliance handles, packaging, top of saddle seat cushions, saddle blankets, hoof pads, cushions (neck, seat, knee, between the knee, knee pads, back, lumbar), tumbling/vault pads, other athletic pads (yoga, martial arts, trampoline border pads) protective equipment (sparring, shin, shoulder, wrist, ankle, knee, elbow, hip, neck, kidney, helmets, gloves), medical positioners (surgical positioners, medical positioning cushions, orthotics, braces, slings), pads for casts for broken bones and other immobilization purposes, floor cushions for standing, bicycle gear (seat cushions, handle bars, gloves, saddles, shorts), martial arts mannequins, computer (mouse pads, keyboard/wrist pads), equip protective bags and cases for computers, cameras, and other equipment, livestock pads (barns and trailers), pet beds, shock absorption, vibration attenuation, gurneys, stretchers, hammocks, toys, baby products (highchairs, cribs, carriers, car seats, teething items, strollers, bassinets), tree collars, any automotive, equipment, boating or recreational vehicle cushions or padding, shipping containers for fragile products, all bedding, furniture and footwear products, infant goods that contact the infant, any medical products that contact the human body, and sporting goods of all types, and any other products requiring cushioning characteristics including, without limitation, pressure relief, shock absorption or vibration attenuation.

Manufacturing Methods

There are many ways to manufacture an alternating patterned gel, some of which are also our inventions. For example, the gel may be compression molded (use of a flat sheet of gel compressed between shaped hot platens). The methods below are considered useful in making alternating pattern gel.

Method No. 1: Obtain or make a flat sheet of gel (with or without microspheres and/or other advantageous additives, such as anti-oxidants, colorant, flame retardants and non-tack additives, and with or without being foamed). An open-faced mold is made with the pattern into which the gel is to be formed, and the mold is heated to a temperature in which the gel will melt or partially melt or soften or flow. The flat sheet of gel is placed on the heated open-faced mold, and the sheet melts or partially melts, or softens or flows and assumes the shape of the pattern. Gravity may be used to encourage such flow. The flat sheet of gel material drapes to form to the pattern shape, then is cooled (which solidifies it and makes it so it can be handled) and it is then pulled off the mold. An alternating pattern gel is the result. The mold is then reheated, and a new sheet is placed on it and the process is repeated. In an alternative, a heat source can be applied to the top of the sheet of gel to help it drape or flow, and airflow or fluid flow can be exposed to the gel sheet to encourage it to conform to the shape of the mold.

Method No. 2: An open-faced mold (which may be room temperature or heated above or cooled below room temperature, depending on the materials used) is put in motion relative to the molten gel coming out of an extrusion flat-sheet die onto the mold with the mold having the desired pattern. The material is allowed to cool and is removed from the mold and an alternating pattern gel results.

By way of example, the open-faced mold may be aluminum, steel or other material, and may be at a temperature that is sufficiently less than the melt temperature of the gel (when the thermal masses of the mold and the gel are taken into account) to "freeze" the gel (i.e., cool it until it is solid and removable), such as 90° F. The stationary extrusion sheet die may, for example, extrude a ⅛ inch thick, 60 inches wide sheet of molten KRATON® E1830/oil gel, which exits the extruder at 375° F. The mold is conducted so that the molten sheet of gel extrudes onto the moving mold, drapes into the pattern of the mold, and then freezes by reducing in temperature to 100° F. and is removed by pulling either by hand or by machine. This process can be made continuous, with the mold pattern being on a continuous belt or on the surface of a rotating cylinder or in discrete pieces that are rotated through the process to fit end-to-end so that there is always a "fresh" mold face moving beneath the melted gel exiting the extrusion die. As an alternative, a heat source can be applied to the top of the sheet of gel to help it drape or flow. Optionally, a source of pressure can be applied at any of a number of temperatures to help the sheet of gel to drape into the mold recesses. For example, a hard or soft material can be used as a pusher, such as, for example, a wheel with hard or soft (e.g., elastomeric or foam) bumps that can continuous rotate to push the molten gel sheet into the recesses. The bumps on the wheel can be any temperature. As another example, air, gas, or liquid of any temperature can be blown onto the surface of the molten sheet of gel to push it into the recesses of the open-face mold. In another alternative, the mold is much hotter than will allow the gel to freeze, then after the gel drapes the mold is cooled so that the gel freezes, for example, by spraying water on the underside of the mold, or on the surface of the gel, or both, to cool the gel.

Method No. 3: This is similar to Method No. 2 except that the mold is convoluted (or otherwise patterned) foam. The molten gel material is allowed to cool to room temperature, and can be left on the foam (such as in the example of FIG. 5) or pulled off the foam. Depending on the melt viscosity of the gel and the porosity of the foam, the gel may or may not adhere to the foam, either of which is useful in making a cushion.

Method No. 4: This method may be similar to Method Nos. 2 or 3, except that instead of extruding a sheet of molten gel onto the patterned mold, it is applied by other means including, but not limited to, spraying or pouring of the molten gel onto the mold. The gel is then removed after it cools sufficiently, or if the mold is made of a foam, the gel may be left in place. The gel may be sprayed with a variety of means including but not limited to, the type of spray equipment that is made to spray hot melt adhesive.

Figure 12:
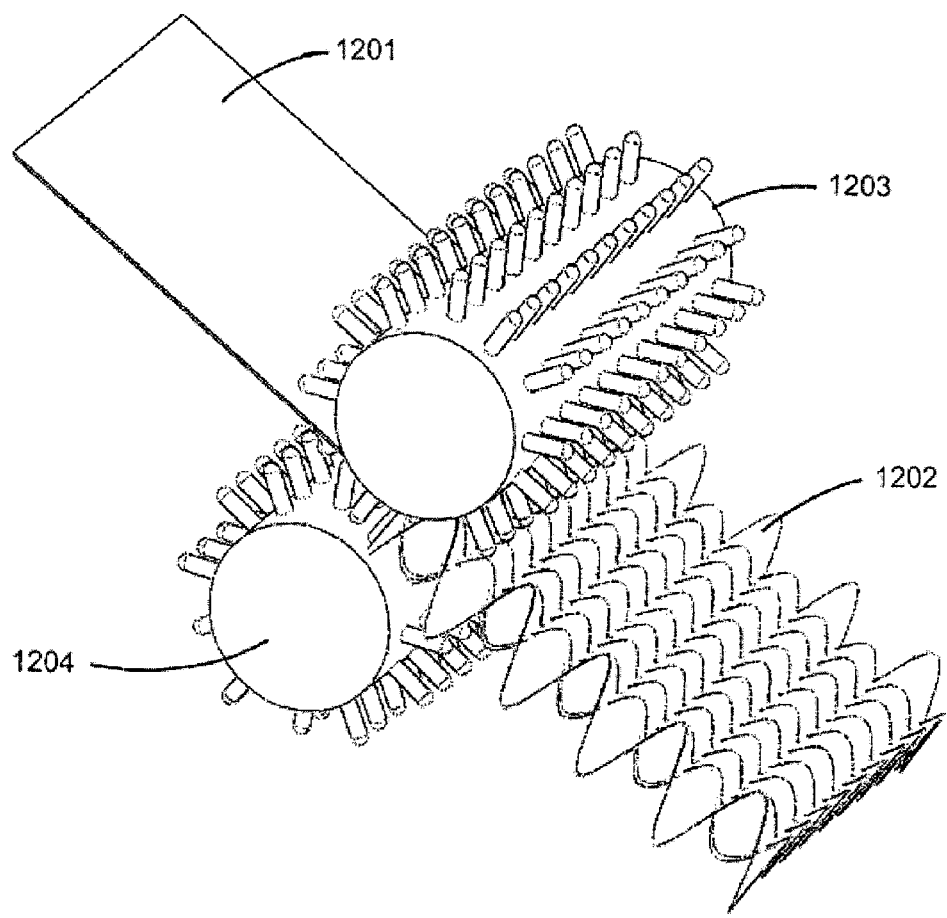
FIG. 12 depicts an example exemplary process for making an alternating pattern gel.

Method No. 5: Referring to FIG. 12, a sheet 1201 of molten gel coming out of an extrusion sheet die can be directed between two rollers 1203 and 1204 with the desired alternating pattern on each roller (which pattern will be impressed into the gel) or with the desired alternating pushing devices (such as that defined by the illustrated pins). In some cases, such as in the two rollers 1203 and 1204 of FIG. 12, the rollers have protrusions that are intended only for pushing the gel and do not of themselves have the final shape of the gel. In the case of the FIG. 12 rollers 1203, 1204, pins are shown that push on each side of a molten sheet of gel, causing a protrusion in the gel on the side opposite the pins and a recess at the location on which the pin bears. As there are two rollers 1203, 1204, the pins on one roller are spaced between the pins on the other roller, and the pins push in opposing directions, which causes the molten or semi-molten gel to stretch, move and form itself into the desired shape. Where the two rollers 1203, 1204 have the final shape of the alternating pattern rather than just having pushing protrusions, the rollers can optionally be temperature controlled to solidify the gel sheet into the desired shape. An alternating pattern gel 1202 results as the gel sheet is pulled through the two rollers 1203, 1204. The pictured embodiment of the gel production would use two rollers 1203, 1204. The two rollers 1203, 1204 can have protrusions such as, for example, rows of pegs that are spaced lengthwise along the rollers 1203, 1204 and also around the circumference. The spacing of the pegs directly determines the final geometry of the gel component. The spacing on the two rollers 1203, 1204 can alternate in opposing alignments so that the pegs press the gel toward the opposite direction and past the tip of the pegs of the opposing roller. This twin roller system can be set up at a specified distance from the output of the extrusion machine so that rollers will not contact the machine, but so that the material enters the rollers as close to the machine temperature as possible. Some shielding may be performed, along the lines of an oven, between the end of the extruder and the rollers so that the material remains pliable for as long as needed. The two rollers 1203, 1204 can be timed to each other and a speed can be used to maintain the proper thickness of the final part. The faster the rollers go, relative to the melted material flow, the thinner the material may tend to be. As the melted material enters the rollers, the opposing pins can push past each other forming the final part. Because of the nature of the gel material, the outer surface cools quickly and the parts of the gel material can either be immediately removed or they can remain on one roller or the other as they pass through a cooling bath for more complete solidification. This part of the gel material is then easily removed.

Instead of using two opposing rollers, this manufacturing process could also be performed using one lower roller and having an upper, sliding peg mechanism. This mechanism would press, slide along with the roller to reduce deformation, retract from the part and repeat the process. This mechanism is timed to the roller so that there are not peg-on-peg collisions and to create the desired part. This particular method could also be performed with two sliding and pressing platens that have the spaced and aligned pegs instead of using one roller. Additionally, the upper mechanism can be the above described sliding and pressing platen and the lower piece could be a discrete platen that is timed as it slides or is pulled under the extrusion device but is stopped and removed when a single part is completed.

At least some of the above methods can employ mechanisms with aligned and oriented pegs. The patterned gel can also be made using a mold base (flat or in roller configuration) that is contoured to the shape of a desired final part instead of using spaced pegs. This contoured piece could then run (with careful timing) under an extrusion outlet and a thin film of material can be placed on the mold. At this point, an operator or mechanism can push the film down into the contoured mold cavity using a compliant peg until the film is against the mold surface. The compliance of the molding peg, or set of pegs, allows the material to stretch evenly as it conforms to the shape of the contoured mold.

Some of the above methods allow for continuous molded parts while others are more suited for discrete parts. Continuously molded parts will allow, generally, for higher production rates and lower part cost while the discrete parts may allow for more adapted or customized parts. These parts could be ones that are, for example, zoned with different arrangements of the pegs or adding details such as, a company logo or a product name.

While the present gel cushions, materials and methods for making the same have been described and illustrated in conjunction with a number of specific configurations, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

We claim:

1. An alternating pattern gel cushioning element comprising:
    a gel cushioning element comprising a sheet of gel material having a first face, a second face, and an outer periphery,
    a plurality of first face gel protrusions extending from the first face of the gel cushioning element, the plurality of first face gel protrusions protruding away from the first face of the gel cushioning element in a direction generally orthogonal to the first face of the gel cushioning element;
    a plurality of first face gel recesses formed in the first face of the gel cushioning element, each of the plurality of first face gel recesses being located adjacent to at least one of the plurality of first face gel protrusions;
    a plurality of second face gel protrusions extending from the second face of the gel cushioning element, the plurality of second face gel protrusions protruding away from the second face of the gel cushioning element in a direction generally orthogonal to the second face of the gel cushioning element; and
    a plurality of second face gel recesses formed in the second face of the gel cushioning element, each of the plurality of second face gel recesses being located adjacent to at least one of the plurality of second face gel protrusions;

wherein a combination of the plurality of first face gel protrusions and the plurality of first face gel recesses form a first face pattern;

wherein a combination of the plurality of second face gel protrusions and the plurality of second face gel recesses form a second face pattern; and wherein the recesses of the plurality of first face gel recesses are aligned with and extend into the protrusions of the plurality of second face gel protrusions, and the recesses of the plurality of second face gel recesses are aligned with and extend into the protrusions of the plurality of first face gel protrusions.

2. The alternating pattern gel cushioning element of claim 1, wherein the first face pattern is generally the same pattern as the second face pattern.

3. The alternating pattern gel cushioning element of claim 1, wherein the first face pattern is a different pattern from the second face pattern.

4. The alternating pattern gel cushioning element of claim 1, wherein at least one of the first face pattern and the second face pattern is a two-dimensional pattern.

5. The alternating pattern gel cushioning element of claim 1, wherein at least one of the first face pattern and the second face pattern is a three-dimensional pattern.

6. The alternating pattern gel cushioning element of claim 1, wherein at least one of the first face pattern and the second face pattern is zoned.

7. The alternating pattern gel cushioning element of claim 1, further comprising a sheet of fabric attached to at least two of the plurality of first face gel protrusions.

8. The alternating pattern gel cushioning element of claim 1, further comprising a base attached to the gel cushioning element.

9. The alternating pattern gel cushioning element of claim 8, wherein the base is attached to the gel cushioning element at least two of the plurality of second face gel protrusions.

10. The alternating pattern gel cushioning element of claim 1, wherein the alternating pattern gel cushioning element comprises a first alternating pattern gel cushioning element and further comprising a second alternating pattern gel cushioning element attached to the first alternating pattern gel cushioning element to form a layered cushioning device.

11. The alternating pattern gel cushioning element of claim 10, further comprising a layer of non-gel cushioning media between the first alternating pattern gel cushioning element and the second alternating pattern gel cushioning element.

12. The alternating pattern gel cushioning element of claim 11, wherein a gel pattern of the first alternating pattern gel cushioning element is the same as a gel pattern of the second alternating pattern gel cushioning element.

13. The alternating pattern gel cushioning element of claim 11, wherein a gel pattern of the first alternating pattern gel cushioning element is different than a gel pattern of the second alternating pattern gel cushioning element.

14. The alternating pattern gel cushioning element of claim 1, manufactured by a method selected from the group consisting of injection molding, open-face molding, compression molding, roller molding, casting, and extrusion.

15. An alternating pattern gel cushioning element comprising:
a gel cushioning element comprising a sheet of gel material having a first side, a second side and an outer periphery;
a plurality of first side gel protrusions extending from the first side of the gel cushioning element, the plurality of first side gel protrusions protruding away from the first side of the gel cushioning element in a direction generally orthogonal to the first side of the gel cushioning element;
a plurality of first side gel recesses formed in the first side of the gel cushioning element, each of the plurality of first side gel recesses being located adjacent to at least one of the plurality of first side gel protrusions;
a plurality of second side gel protrusions extending from the second side of the gel cushioning element, the plurality of second side gel protrusions protruding away from the second side of the gel cushioning element in a direction generally orthogonal to the second side of the gel cushioning element; and
a plurality of second side gel recesses formed in the second side of the gel cushioning element, each of the plurality of second side gel recesses being located adjacent to at least one of the plurality of second side gel protrusions;
wherein a combination of the plurality of first side gel protrusions and the plurality of first side gel recesses form a first side pattern;
wherein a combination of the plurality of second side gel protrusions and the plurality of second side gel recesses form a second side pattern; and
wherein the recesses of the plurality of first side gel recesses are aligned with and extend into the protrusions of the plurality of second side gel protrusions, and the recesses of the plurality of second side gel recesses are aligned with and extend into the protrusions of the plurality of first side gel protrusions.

16. The alternating pattern gel cushioning element of claim 15, wherein the first side pattern is a two-dimensional pattern.

17. The alternating pattern gel cushioning element of claim 15, wherein the first side pattern is a three-dimensional pattern.

18. The alternating pattern gel cushioning element of claim 15, wherein the first side pattern is zoned.

19. The alternating pattern gel cushioning element of claim 15, further comprising a sheet of fabric attached to at least two of the plurality of first side gel protrusions.

20. The alternating pattern gel cushioning element of claim 15, further comprising a foam base attached to the alternating pattern gel cushioning element.

21. The alternating pattern gel cushioning element of claim 15, wherein the alternating pattern gel cushioning element comprises a first alternating pattern gel cushioning element and further comprising a second alternating pattern gel cushioning element attached to the first alternating pattern gel cushioning element to form a layered cushioning device.

22. The alternating pattern gel cushioning element of claim 21, further comprising a layer of non-gel cushioning media between the first alternating pattern gel cushioning element and the second alternating pattern gel cushioning element.

23. The alternating pattern gel cushioning element of claim 22, wherein a gel pattern of the first alternating pattern gel cushioning element is the same as a gel pattern of the second alternating pattern gel cushioning element.

24. The alternating pattern gel cushioning element of claim 23, wherein a gel pattern of the first alternating gel pattern cushioning element is different than a gel pattern of the second alternating gel pattern cushioning element.

25. The alternating pattern gel cushioning element of claim 15, manufactured by a method selected from the group consisting of injection molding, open-face molding, compression molding, roller molding, casting, and extrusion.

* * * * *